US007460891B2

(12) United States Patent
Koch et al.

(10) Patent No.: US 7,460,891 B2
(45) Date of Patent: Dec. 2, 2008

(54) METHOD AND SYSTEM TO SHUT DOWN AND CONTROL COMPUTER RADIOS

(75) Inventors: Zeke Koch, Seattle, WA (US); Susan E. Pappalardo, Kirkland, WA (US); Ray Sun, Seattle, WA (US); James D. Drage, Seattle, WA (US); Chee H. Chew, Redmond, WA (US); Joel P. Dehlin, Redmond, WA (US); Debbie M. Yau, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 10/405,866

(22) Filed: Apr. 1, 2003

(65) Prior Publication Data

US 2004/0076177 A1    Apr. 22, 2004

Related U.S. Application Data

(60) Provisional application No. 60/419,874, filed on Oct. 21, 2002.

(51) Int. Cl.
*H04B 1/00* (2006.01)

(52) U.S. Cl. .................. 455/574; 455/13.1; 455/572; 455/573; 719/320; 719/330; 719/340; 719/321; 719/323; 719/324; 709/223

(58) Field of Classification Search ........... 455/566, 455/574, 95, 466, 552.1, 553.1, 572, 13.1, 455/550.1, 573; 713/330, 320, 324; 719/320, 719/321, 323, 324, 340, 330; 709/223
See application file for complete search history.

(56) References Cited

U.S. PATENT DOCUMENTS

| | | | | |
|---|---|---|---|---|
| 5,560,022 A * | 9/1996 | Dunstan et al. | ............. | 713/300 |
| 5,737,394 A * | 4/1998 | Anderson et al. | ........ | 379/88.11 |
| 5,903,832 A * | 5/1999 | Seppanen et al. | ........ | 455/435.3 |
| 6,418,309 B1 * | 7/2002 | Moon et al. | ................. | 455/418 |
| 6,751,561 B2 * | 6/2004 | Oh | .............................. | 702/60 |
| 6,829,494 B2 * | 12/2004 | Tanabe | ....................... | 455/574 |
| 6,853,840 B2 * | 2/2005 | Najafi | ......................... | 455/410 |
| 2001/0034251 A1 * | 10/2001 | Goto | ........................... | 455/566 |
| 2002/0037718 A1 * | 3/2002 | Watanabe | ................... | 455/423 |
| 2002/0173301 A1 * | 11/2002 | Ikeda | ......................... | 455/419 |
| 2007/0037610 A1 * | 2/2007 | Logan | ........................ | 455/574 |

* cited by examiner

*Primary Examiner*—Charles N Appiah
*Assistant Examiner*—Kwasi Karikari
(74) *Attorney, Agent, or Firm*—Workman Nydegger

(57) ABSTRACT

A system and method that facilitates control of the power states of a mobile device's wireless radios. Radios can be collectively turned off in a straightforward, intuitive operation, and can be restored to a powered-on state in a similar manner. In addition to collective powering down and restoring, the power states of individual radios can be controlled in a selective manner. When any radio is on, a connectivity dialog provides a link for collectively turning wireless devices off. When no radios are on, the connectivity dialog provides a corresponding link to turn wireless radios on, which may be only those that were on prior to the collective shutdown. A settings user interface, such as accessible via a link on the connectivity dialog, provides on/off radio buttons and checkboxes that enable the selective control of radio power state.

38 Claims, 13 Drawing Sheets

METHOD AND SYSTEM TO SHUT DOWN AND CONTROL COMPUTER RADIOS

CROSS-REFERENCE TO RELATED APPLICATION

The present invention claims priority to U.S. provisional patent application Ser. No. 60/419,874, filed Oct. 21, 2002 and herein incorporated by reference.

FIELD OF THE INVENTION

The invention relates generally to wireless computing devices.

BACKGROUND OF THE INVENTION

Small, mobile computing devices such as personal desktop assistants, contemporary mobile telephones, hand-held and pocket-sized computers, tablet personal computers and the like, are becoming important and popular user tools. In general, they have become small enough to be extremely convenient, while consuming less battery power, and at the same time have become capable of running more powerful applications.

Recent developments have resulted in such devices being able to connect to networks, including the Internet. Contemporary mobile devices such as a PocketPC thus may integrate a variety of wireless radios that are used for transmitting information. For example, a typical mobile computing device may integrate a cellular phone, Wireless Ethernet (also known as 802.11b or Wi-Fi), and Bluetooth™ wireless technology. Likewise, mobile telephones such as those running Microsoft® Smartphone software allow users to make conventional mobile telephone calls and also access the Internet, as well as send and receive e-mails and files, store contacts, maintain appointments and do many other things contemporary computers can now do. While the connectivity features of such devices provide a number of benefits, having wireless connectivity leads to a number of problems. For example, in certain environments, wireless radios are not allowed, however the usage of a mobile device for other reasons, such as for data entry or playing games, still may be desired. As a further problem, wireless radios consume power and in some cases users will want to take a more active role in managing their power state. Still other times, a user may want a certain radio active, such as the radio that provides a Bluetooth™ connection, but not the radio that enables the device to act as a cellular phone.

In sum, there are times when users want a mobile device operational, but in a state in which one or more, or all wireless radios are selectively turned off, or turned off as a whole. Improvements in convenience that increase the usability of mobile devices are needed, however heretofore there has been no convenient solution to providing power control of a mobile device's wireless radios.

SUMMARY OF THE INVENTION

Briefly, the present invention is directed towards a system and method implemented in part in an improved user interface that facilitates control of the power state of a mobile device's wireless radios. Radios can be turned off in a straightforward, intuitive operation, and can be restored to a powered-on state in a similar manner. In addition to collective powering down and restoring, the power states of individual radios can be controlled in a selective manner. The present invention is capable of being used on any mobile device having remote communications capability, including mobile telephones and mobile (e.g., handheld, tablet or pocket-sized) computing devices.

In general, a connectivity dialog such as in the form of a pop-up bubble, provides a user interface that facilitates working with network connections. In one implementation, the connectivity dialog is activated by pen events or the like received at a system icon, e.g., with touch-sensitive screens, the connectivity dialog may be activated by tapping on an antenna icon or the like.

To control the radios' power states, when at least one wireless radio is on, the connectivity dialog provides a "Turn Wireless Off" link. In the event that no radios are on, (but at least one radio is present), the connectivity dialog provides a corresponding "Turn Wireless On" link. The user interface determines how to display the connectivity dialog based on various radio power control rules in conjunction with the current power state of the device's radios, e.g., as received from a power manager in the system.

The rules also determine the action to take for commands received at the user interface, e.g., shut down the radios. For example, the "Turn wireless off" link is shown if any of the known radios are on, and when this link is actuated, the known wireless radios in a mobile computing device are automatically turned off by communicating with the power manager. Before turning them off, the power state of each radio is preserved, so that when radios are turned back on, only the radios that were on at the time that the collective shutdown was requested are restored.

More particularly, in the event that known wireless radios (e.g., all of them) are off, a counterpart a "Turn wireless on" link is provided in the connectivity dialog. When the user actuates the "Turn wireless on" link, only those radios that were on prior to shutdown are restored to their on state, which is accomplished by recalling the previously saved power state data. Alternative ways to activate radios are also provided, such as to allow a telephone to be turned on when needed from a program directed to making telephone calls. Electing to turn on the telephone may also automatically result in other (e.g., previously on) radios being turned on, in a collective restore operation.

A further improvement provided by the method and system of the present invention allows the user to control the state of each radio individually. In one implementation, a settings user interface, such as accessible via a link on the connectivity dialog, provides on/off radio buttons and checkboxes that enable the selective control of radio power state. Each checkbox corresponds to a listed wireless radio. The "On" radio enables the checkboxes for interaction, while the "Off" button disables the checkboxes. The selected/deselected state of each radio is displayed in the checkboxes, even when disabled. When the checkboxes are set as desired by the user, clicking an "OK" button controls the actual state of the radios.

In this manner, the present invention facilitates rapid and convenient control of radio operation in a number of scenarios. Other advantages will become apparent from the following detailed description when taken in conjunction with the drawings, in which:

DETAILED DESCRIPTION

Exemplary Operating Environment

Figure 1:
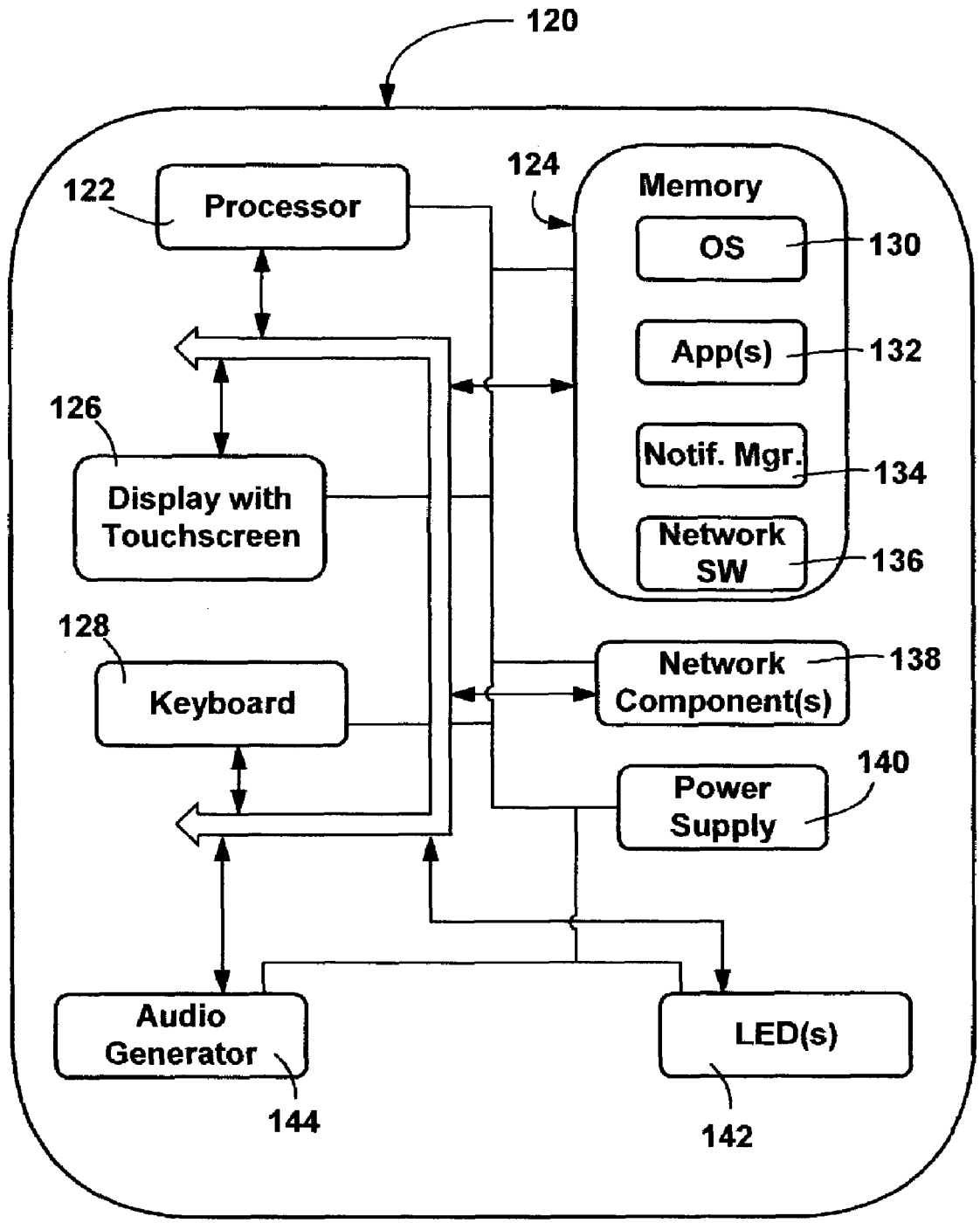
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® XP operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Wireless Radio Power Control

Figure 2:
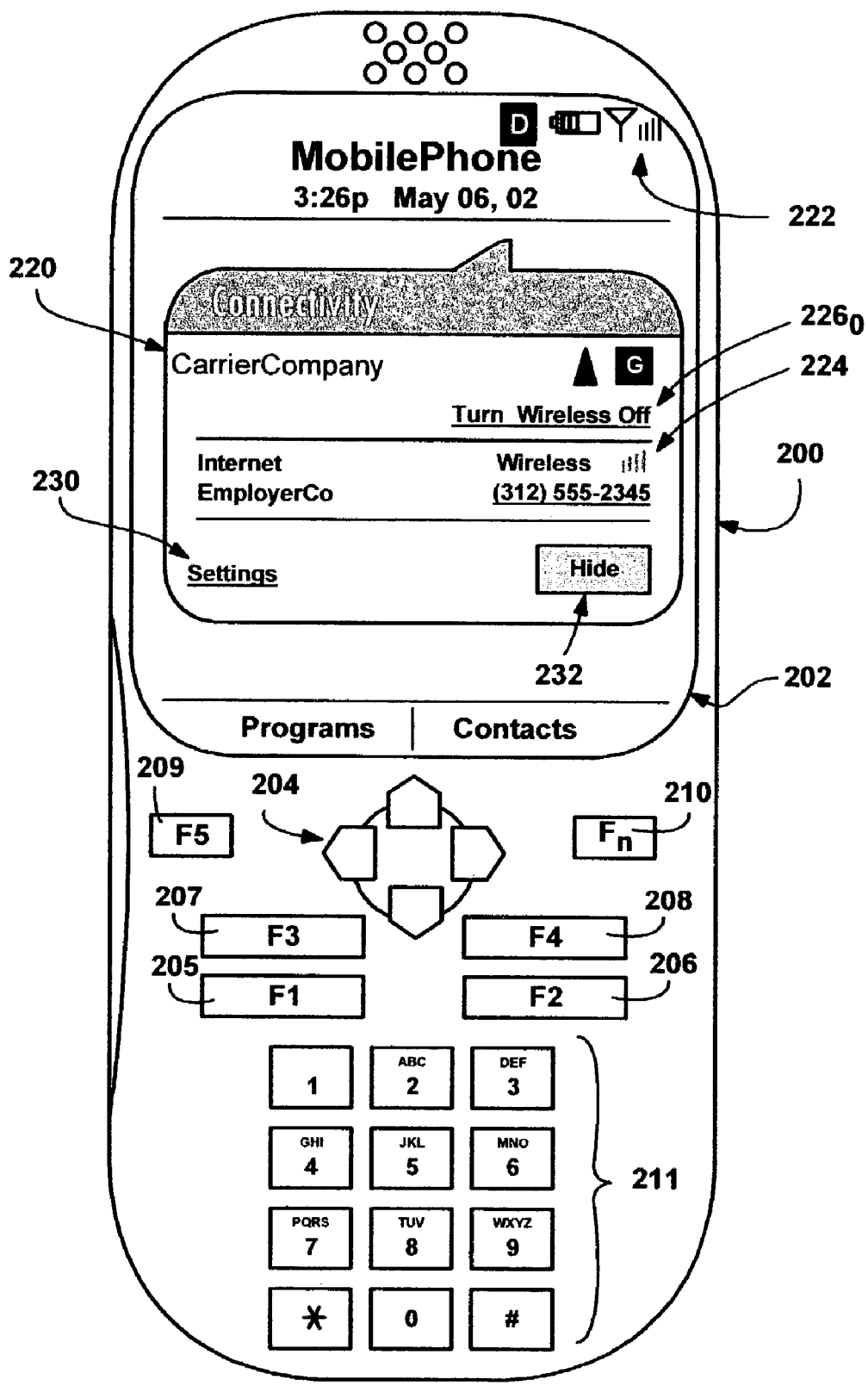
FIG. 2 is a simplified representation of a mobile telephone constructed in accordance with an aspect of the present invention, including a mechanism for turning off radios.
Figure 3:
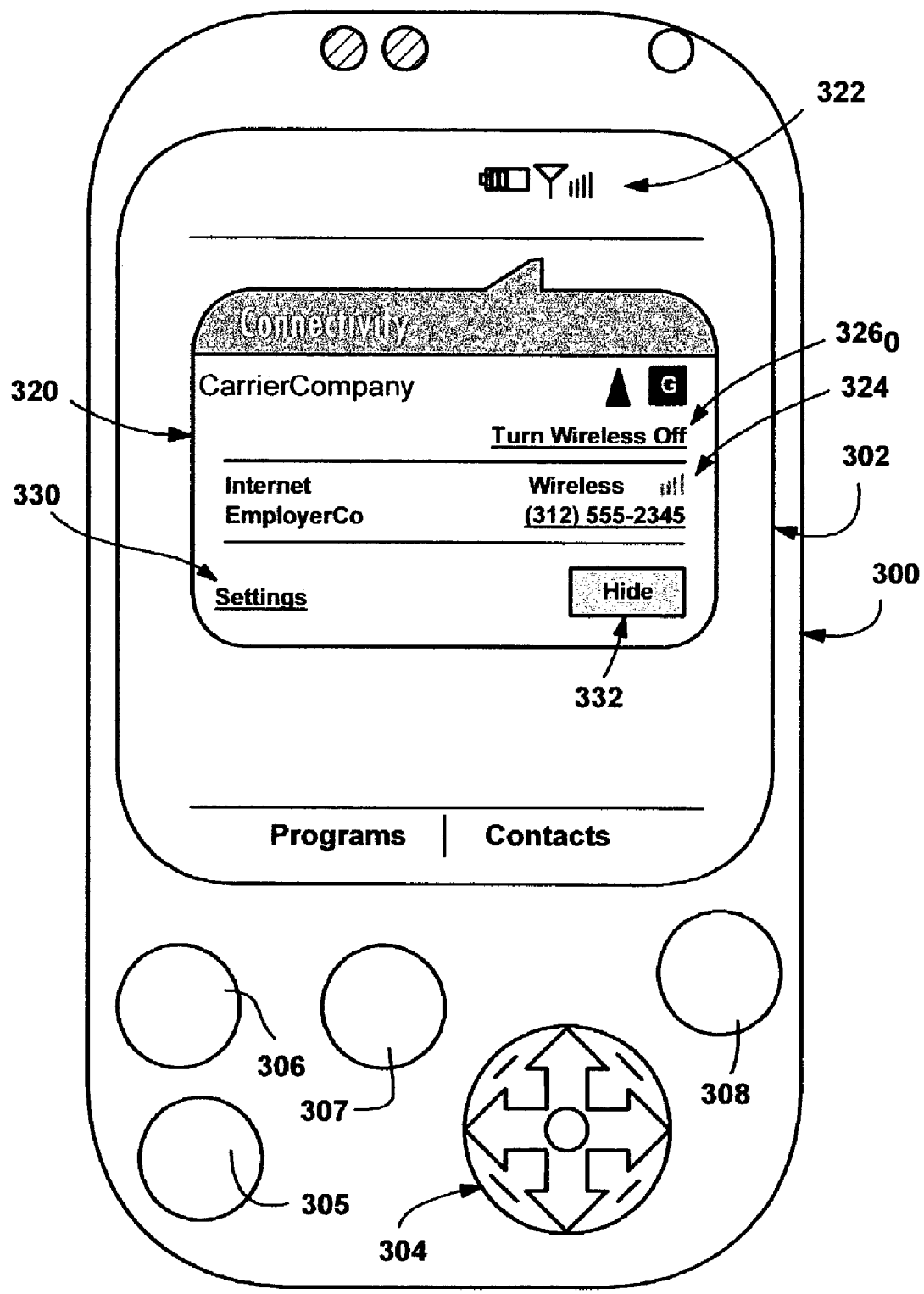
FIG. 3 is a simplified representation of a pocket-sized or handheld computing device constructed in accordance with an aspect of the present invention, including a mechanism for turning off radios.

In general, the present invention is capable of being used on any mobile device having remote communications capability, such as the example mobile telephone 200 of FIG. 2 or the example handheld computing device 300 of FIG. 3, e.g., a PocketPC device. FIG. 2 represents an example mobile telephone 200, with a touch-sensitive display 202 arranged to interface with a user in accordance with the present invention. The mobile telephone 200 typically also includes some suitable number of hardware buttons (e.g., buttons 204-211) that receive user input to perform various functions, possibly including radio power control in keeping with the present invention as described below.

As also described below, a connectivity dialog 220, shown in the form of a pop-up bubble, provides a user interface that facilitates working with network connections, e.g., displayed with current status 224 on the display 220. In one implementation, the connectivity dialog 220 may be activated by tapping on an antenna/signal strength indicator 222. Note that FIG. 2 represents one such connectivity user interface dialog 220 (corresponding to the user interfaces 320, 420 and 520 of FIGS. 3-5) by which the user is able to perform connectivity-related operations, such as to make a connection. Other aspects of this notification dialog are described in U.S. patent application Ser. No. 10/292,613, entitled "Connectivity Notification Displaying Path to Connection," filed Nov. 12, 2002, assigned to the assignee of the present patent application and hereby incorporated by reference.

FIG. 3 is a representation of a handheld computing device 300 (such as the device 120 described with reference to FIG. 1) with a touch-sensitive display 302. The device may also include some suitable number of hardware buttons, e.g., buttons 304-308. As with the mobile telephone 200 and as described below, a similar connectivity dialog 320, also shown in FIG. 3 in the form of a pop-up bubble, provides a user interface that facilitates working with network connections. In this device, the connectivity dialog 320 may be similarly activated by tapping on an antenna/signal strength indicator 332. Note that as generally used herein and in the drawings, the last two digits of labeled numbers match for like items, e.g., the connectivity dialog of FIG. 2 is labeled 220, while in FIG. 3 the connectivity dialog is labeled 320, and so on.

Figure 4:
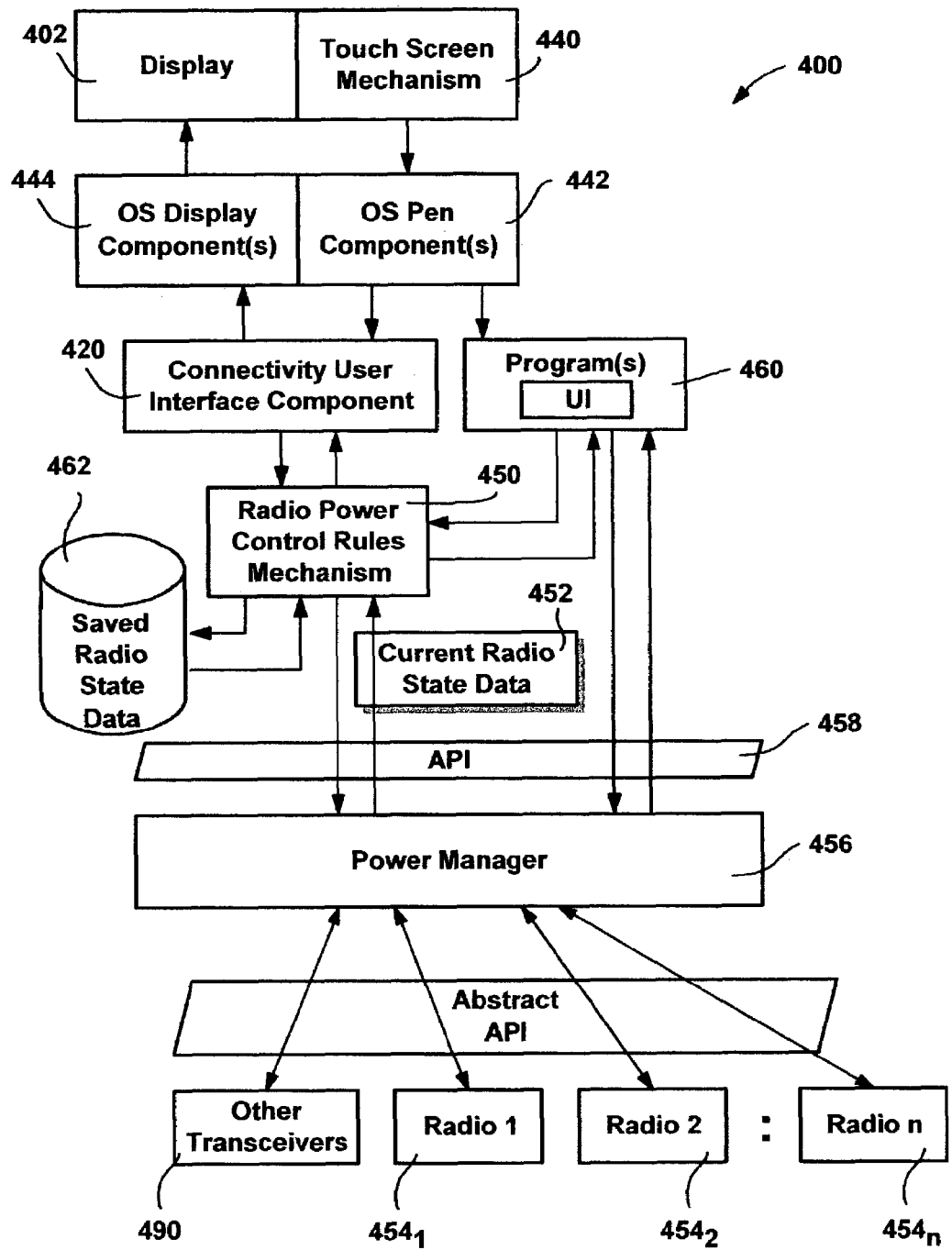
FIG. 4 is a block diagram generally representing components for implementing various aspects of the present invention.

To interact with the user interface, as represented in the example architecture 400 of FIG. 4, in general, when the display 402 is contacted, (which includes devices in which sufficiently close proximity to the screen is sensed even if not actually contacted), a touch screen mechanism 440 provides coordinates in the form of pen events to an operating system pen component 442. In turn, the operating system pen component (or components) 442 determine the underlying meaning of the location that has been contacted, that is, what action to take based on what icon, window, and so on presently corresponds to the contacted location. In this manner, the user is able to contact the displayed antenna/signal strength meter (e.g., 322 of FIG. 3) to obtain the connectivity user interface 320, and interface with that user interface's underlying code component 420, as displayed via operating system display components 444.

In accordance with an aspect of the present invention, there is provided improved user interfaces and methods to selectively or collectively control the power (on/off) state of the various wireless radios in a mobile computing device, which is often desirable for power consumption purposes and/or regulatory reasons. Note that as used herein, the terms "wireless" and/or "radio" refer to any type of transceiver mechanism that it is desirable to selectively control, including cellular telephone radios, wired devices and other types of transceivers, such as infrared.

Figure 5:
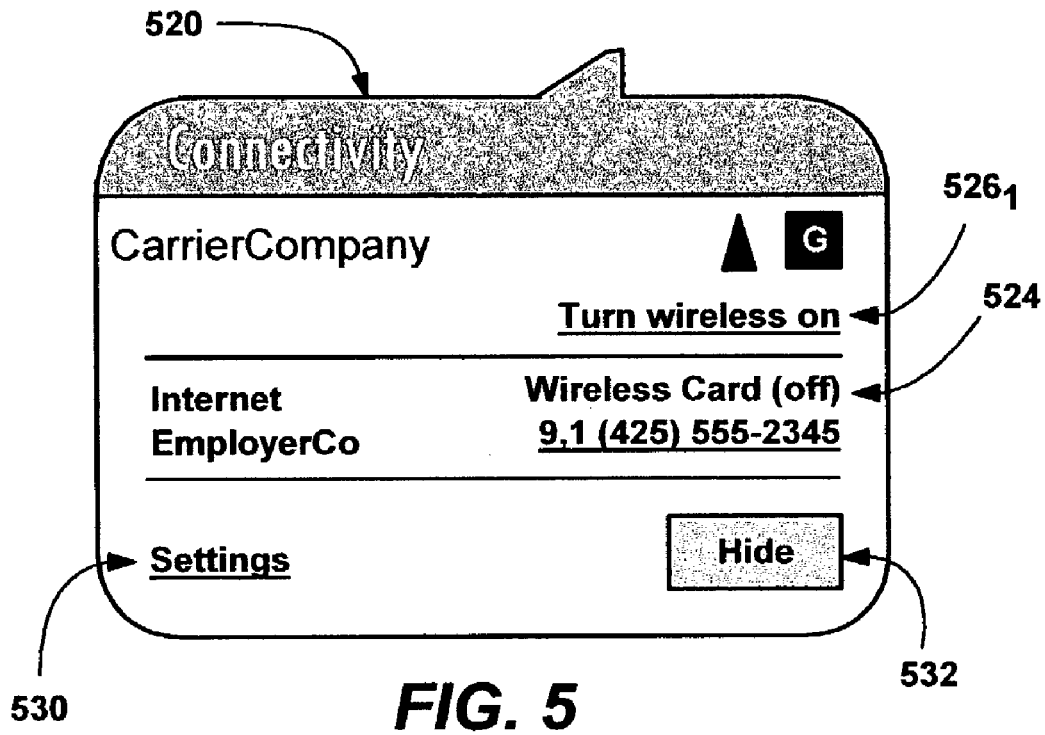
FIG. 5 is a representation of an example connectivity user interface dialog including a mechanism for turning on radios in accordance with an aspect of the present invention.

To control the radios' power states, when at least one wireless radio is on, the connectivity dialog provides a "Turn Wireless Off" link, represented in FIGS. 2 and 3 as links $226_0$ and $326_0$, respectively. In a preferred implementation, if there are no wireless devices to disable, the link is not shown. In the event that at least one radio is present but no radios are on, as represented in FIG. 5, the connectivity dialog 520 provides a corresponding "Turn Wireless On" link $526_1$. Note that for purposes of clarity, the example connectivity dialog of FIGS. 2-5 will primarily be described with respect to FIG. 5 and the reference numerals therein, particularly in a state in which no radios are on, however it is understood that in these examples, the dialogs displayed on the devices of FIGS. 2 and 3 generally operate in the same way, (when at least one radio is on). For example, the user can also interface with the dialog 520 to actuate a "Settings" link 530, which takes the user directly to a connection manager user interface settings user interface 660 (FIG. 6); the settings user interface 660 can also be accessed via a corresponding link 230 or 330 FIGS. 2 and 3. The settings user interface 660 and other aspects of the connectivity dialog 520 are described below with reference to the flow diagrams of FIGS. 8-12.

Note that in the examples including that of FIG. 5, a dropdown connectivity bubble 520 is shown as being invoked by tapping an icon, however the present invention can utilize virtually any notification-like user interface, such as a dialog or message box, and/or other actuation mechanisms including a pointer click. For example, in an alternative implementation on a device referred to as the Smartphone, this link is also provided, however in the Smartphone, the "Turn Wireless Off" link may become accessible by pressing the power button. Other activation mechanisms are feasible, such as an acutable link arranged as a hardware button, e.g., on a PocketPC device.

In the example implementation represented in FIG. 4, the user interface component 420 determines how to display the connectivity dialog based on a radio power control rules mechanism 450 (FIG. 4) which knows (or can obtain) the current power state 452 of the device's radios $454_1$-$454_n$. For example, the system preferably includes a power management component (power manager) 456 that the radio power control rules mechanism 450 can call (e.g., via an API layer 458) to obtain the information and/or control the radios $454_1$-$454_n$. As can be appreciated, the rules mechanism 450 may be incorporated into the connectivity user interface component 420, however in FIG. 4 the radio power control rules mechanism 428 is shown as separate from the user interface component 420. Note that another program 460, (such as a telephone-related program of FIG. 7), is also shown communicating with the radio power control rules mechanism 450 and power manager, which represents the ability to control radio power programmatically, and not only by the user interface 420.

As described above, the "Turn wireless off" link $326_0$ (FIG. 3) is shown if any of the known radios are on. When this link $326_0$ is actuated, all of the known wireless radios in a mobile computing device are automatically turned off. Note that as used herein, any active radios are turned off by this operation, while others can be considered as turned off, even if not actually turned off because they were already off. To this end, as represented in the example system of FIG. 4, when the link $326_0$ (FIG. 3) is actuated, the user interface 420/rules mechanism 450 communicates with the power manager 456 of the system, which turns off the various wireless radios $454_1$-$454_n$. Note that it is alternatively feasible to have the user configure the operation of the device to turn off only certain ones of the radios, and/or to perform additional actions in response to actuation of this link. Further, as described below, clicking this link $326_0$ will save the current on/off state of each of the radios as saved radio state data 462, as the state existed before turning off those that were on. FIG. 4 represents the radio power control rules mechanism 450 saving the state data 462 to a data store.

In the event that known wireless radios (e.g., all of them) are off, a counterpart "Turn wireless on" $526_1$ link is provided in the dialog 520. By saving and recalling the state data 462, when the user wants to turn the radios $454_1$-$454_n$ back on, only those that were on prior to shutdown may be restored by clicking this link. Note that as described below, the user can manually turn other radios on, such as via the settings dialog 660, however in this implementation, convenience is provided by restoring the previous state when turning radios on after a collective "turn off" command. If there is no saved state data 462, all the known radios may be turned on, or possibly some lesser amount as pre-configured by the user or by default settings.

Figure 7:
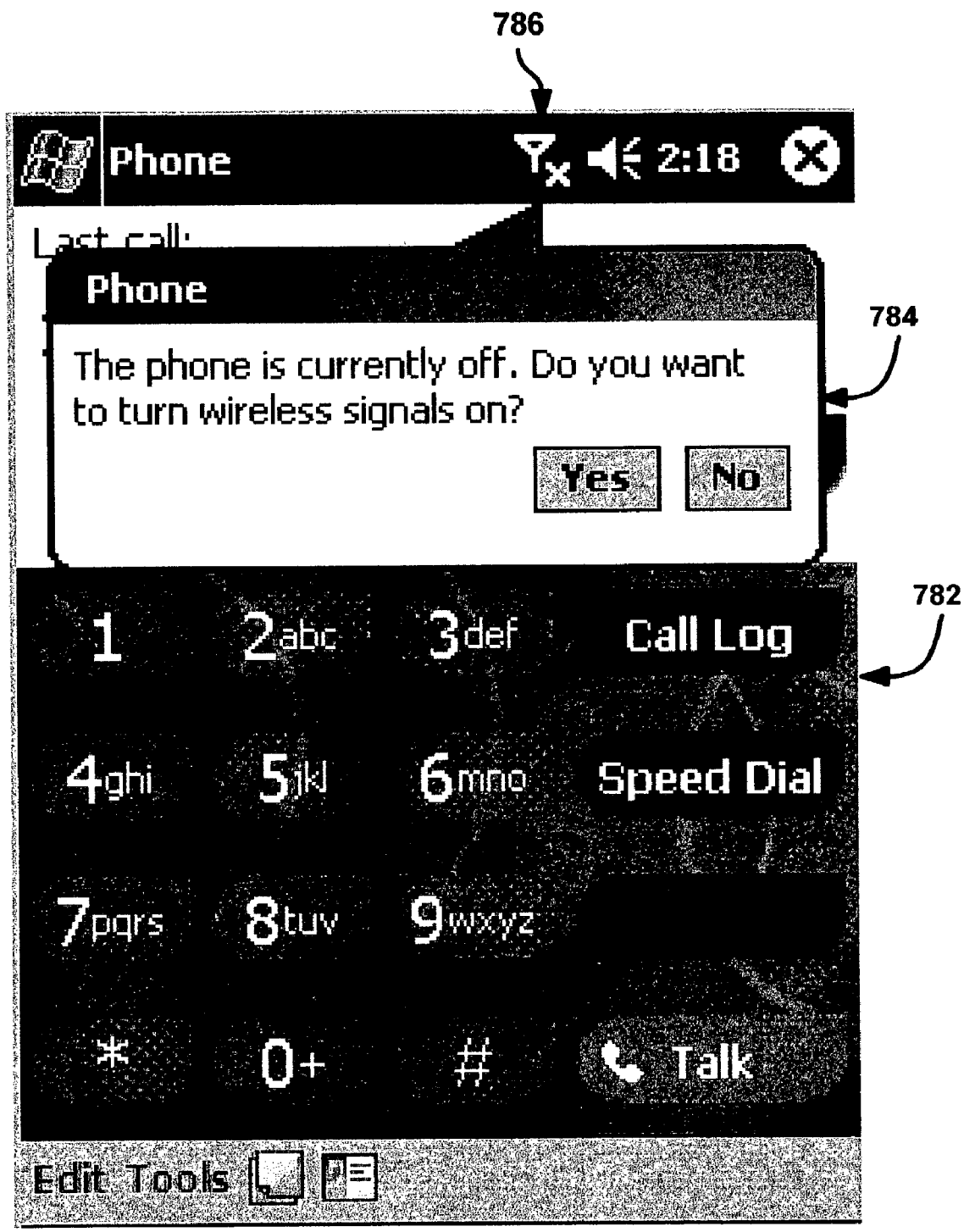
FIG. 7 is an alternative user interface for turning on a mobile telephone radio in accordance with an aspect of the present invention.

In an alternative operating state, represented in FIG. 7, in which the device (which is not necessarily a smart mobile telephone) runs a telephone program (e.g., the program of FIG. 4 having a displayed user interface 782 in FIG. 7) so as to provide telephone services, another, more specific dropdown dialog may be displayed when the telephone radio is off. For example, because the operating system knows that the active (focused) program is the phone program 460, the operating system can provide a more selective dialog 784 when the "disconnected" antenna icon 786 is tapped. In this example, because the user is operating in a telephone mode rather than a general system mode, the more specific dialog bubble 784 appears to let the user turn the phone on when it is off by clicking the "Yes" button. Clicking the "No" button hides the bubble without turning any radios on. A counterpart Yes/No "turn off" bubble (not shown) can appear in this mode as appropriate when the phone is on, to let the user turn the phone off.

Thus, as represented in FIG. 7, if the device's phone is off, and the user performs an action that requires the phone to be on, the user receives a prompt to turn the phone on and complete the call. This may be in the form of the notification/prompt bubble 784 as represented in FIG. 7, which also may be shown when the user tries to initiate a data connection that uses the phone. Note that it is also feasible to have a state (e.g., as configured by the user) to automatically turn the phone on without prompting, although a safety mechanism may be desirable so that the user does not turn the phone on at the wrong time, such as when radio interference restrictions are present.

Although represented in a telephone scenario, FIG. 7 also represents an automatic way to facilitate enabling of other radios when appropriate. For example, if the user originally turned the phone off using the collective "Turn wireless off"

link, the system may be configured such that clicking a "Yes" response restores the previous state of the other radios, as well as turning the phone on, that is, an assumption is made that if the user clicked "Turn wireless off" earlier, he or she would like the previous radio state restored when placing a phone call. Alternatively, if the user has only turned the phone off, only the phone will be turned back on. These assumptions may be overridden by enabling the user to override such default settings. Further, note that a similar prompt to that of FIG. 7 can be used for other wireless devices, e.g., a user performing an action that needs access to the internet can receive a similar yes/no prompt, which may also automatically turn on other radios in a collective restore operation.

While the above-described collective switch is thus highly convenient, the on/off link only allows the user to control the state of the radios as a whole, simultaneously. A further improvement provided by the present invention allows the user to control the state of each radio individually, e.g., for battery saving purposes. To this end, the present invention provides benefits in other scenarios by enabling the selective turning off of certain of the radios. For example, a user may want to turn off only the phone, such as to avoid receiving phone calls, but not the other radios so that wi-fi connectivity is still available, such as in a meeting where the user does not want to receive calls, but needs wi-fi connectivity. Although it is feasible to turn the ringer off, some users may prefer to turn the phone off, e.g., because this would extend battery life. Also, to save battery life, a user may prefer that a phone turn off rather than roam in analog mode. This also may be programmatically controlled, so that an external application may turn on/off a selected radio. A user may also selectively want to turn off wi-fi off only, such as to avoid wi-fi hacking, and/or to save power with integrated wi-fi, such as when wi-fi is ordinarily not used by that particular user. Note that as wi-fi becomes cheaper, more devices will have integrated wi-fi, and if on by default, some users will want to turn it off. Other users may want to save battery life at certain times, whereby turning off wi-fi would be desirable. Additionally, a user may also selectively want to turn off Bluetooth™, although Bluetooth™ has a separate on/off switch, and is off by default. However, at times a Bluetooth™ user may not want to connect to other Bluetooth™ devices, or may not want to be discoverable. Also, a user may want to selectively turn off Bluetooth™ to save battery life.

Figure 6:
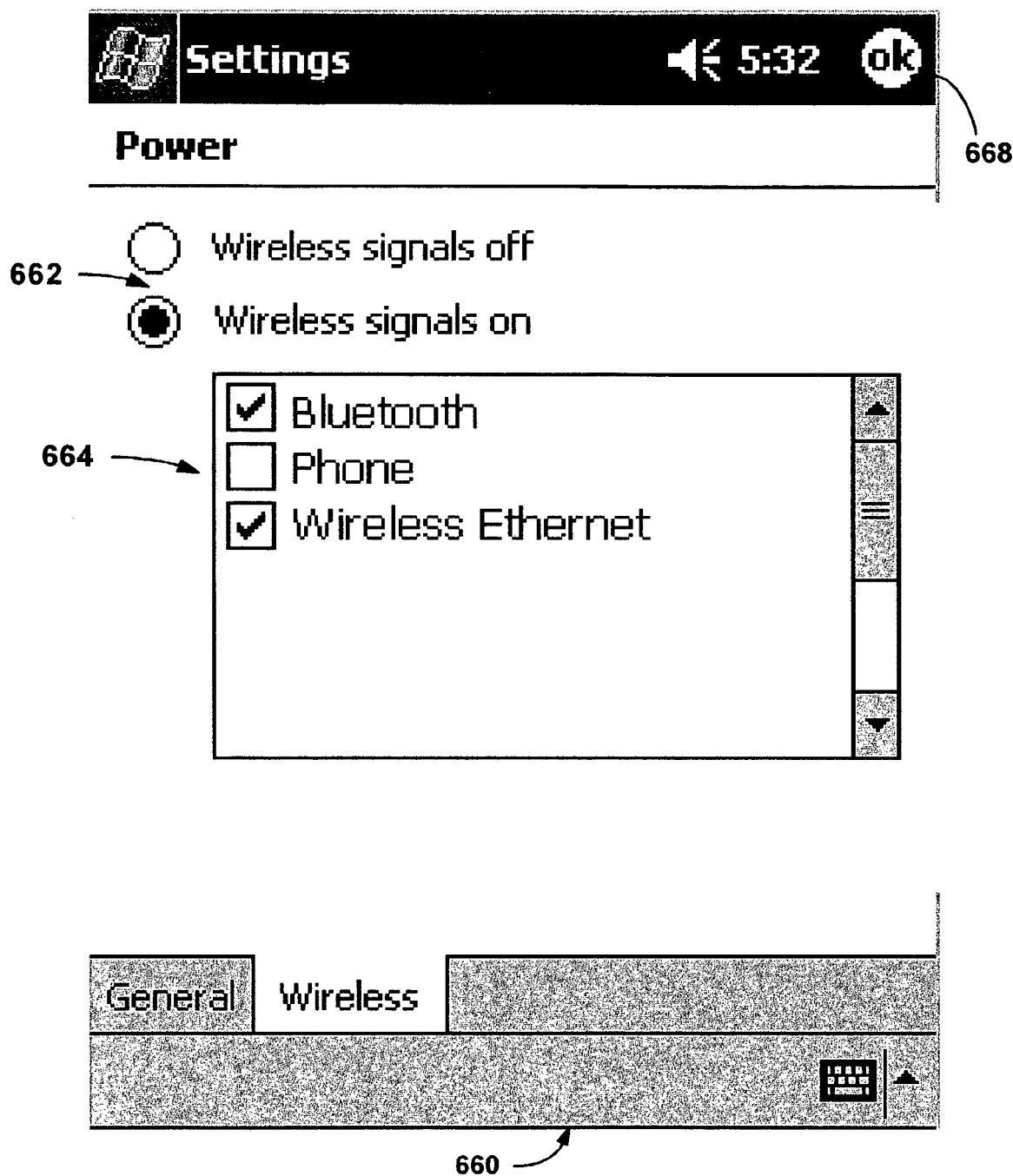
FIG. 6 is a representation of an example settings user interface for selectively controlling radios in accordance with an aspect of the present invention.

In one implementation, the settings user interface 660 of FIG. 6 provides on/off radio buttons 662 and checkboxes 664 that enable the selective control of radio power state. As described above, from the connectivity dialog 520 the user can click the settings link 530 (FIG. 5) to have the settings user interface 660 displayed for interaction. In an alternative to obtaining the settings dialog 660 via the connectivity dialog's settings link 530, the settings dialog may be exposed in a Control Panel, Power user interface, such as under a "wireless" tab, e.g., the user interface 660 of FIG. 6 may be made to appear by selecting a "Control Panel" user interface, then selecting a "Power" user interface, and from there selecting a "Wireless" tab.

As represented in FIG. 6, in general, the "On" radio button will enable the checkboxes 664 for interaction, while the "Off" button will disable (e.g., gray-out) the checkboxes 664. As described below, the selected/deselected state of each radio is displayed in the checkboxes even when disabled, and clicking the "OK" button 668 controls the actual state of the radios. The rules for the settings user interface 660 are further described below, and with particular reference to FIGS. 10-12.

In general, the settings user interface 660 lists the radios in a listview that can display some number of entries (e.g., up to six) before scrolling, along with their status. If there are no radios, the "Wireless signals off" radio button is selected. When a detached wireless device (e.g., a plug in card) is inserted into the computing device, the wireless device is turned back on automatically, independent of any previous setting. If any wireless device is removed while the user is in this wireless dialog, the radios are enumerated through the power manager 456, whereby the item is removed from the display.

When the settings user interface 660 is displayed, if the known radios are off, the "Wireless signals off" radio button is selected and the checkbox list 664 is disabled. If there is a saved radio state (from the user changing to "Wireless signals off" earlier), the saved state is shown in the checkboxes 664, even when disabled. If any of the known radios are on, the "Wireless signals on" radio button is instead selected and the checkbox list 664 is enabled. Note that Bluetooth™ already may have its own on/off switch elsewhere on the device. If Bluetooth™ is on or discoverable, the checkbox is checked. If the user un-checks it, Bluetooth™ is set to off. If Bluetooth™ is off and the user checks the box, Bluetooth™ is set to on.

If the user manually un-checks the radios and selects the "OK" button 668, the user has effectively switched to the wireless off mode. Therefore, the switch to the wireless off mode is automatically made, and the state of the radios when the user originally entered this tab is saved. This lets the user quickly turn all the wireless devices back on with the "Turn wireless on" link 526, of the connectivity bubble 520, as described above.

It should be noted that other transmission mechanisms, such as an infrared transceiver 490 (FIG. 4) or even wired connections, may also be selectively turned off in a similar manner by the present invention, e.g., to save battery power. In such a situation, these other transmission mechanisms may be listed in the setting user interface 660 with a corresponding checkbox.

Note that for extensibility, the present invention provides a method for a third party to identify their radio to the system, so that a third party radio can be turned on/off in the same manner as others that are known to the system. A hardware switch may also be provided to duplicate this functionality, e.g., where the actuation method may comprise 'press and hold' or 'press.' In this event, the user interface will similarly reflect the state changes resulting from actuation of the hardware button. Thus, as used herein, any type of hardware switch such as a button or combination of buttons, however actuated (e.g., by a press or press and hold) that can change the power state of the radios will be considered a "link" (equivalent to a displayed actuable link), and actuation thereof will result in the user interface displaying the appropriate state of the radios in response to the actuation.

In this manner, the present invention facilitates rapid and convenient control of radio operation in a number of scenarios, such as when necessary to avoid radio interference, e.g., when upon an airplane or in a hospital. For example, cellular phones, Bluetooth™, and wi-fi radios are not presently allowed to operate on airplanes, whereby the present invention facilitates turning such radios off, (although of course the user should carefully verify that all such radios are turned off when required, not just some, or that one or more radios are inadvertently turned back on).

Figure 8:
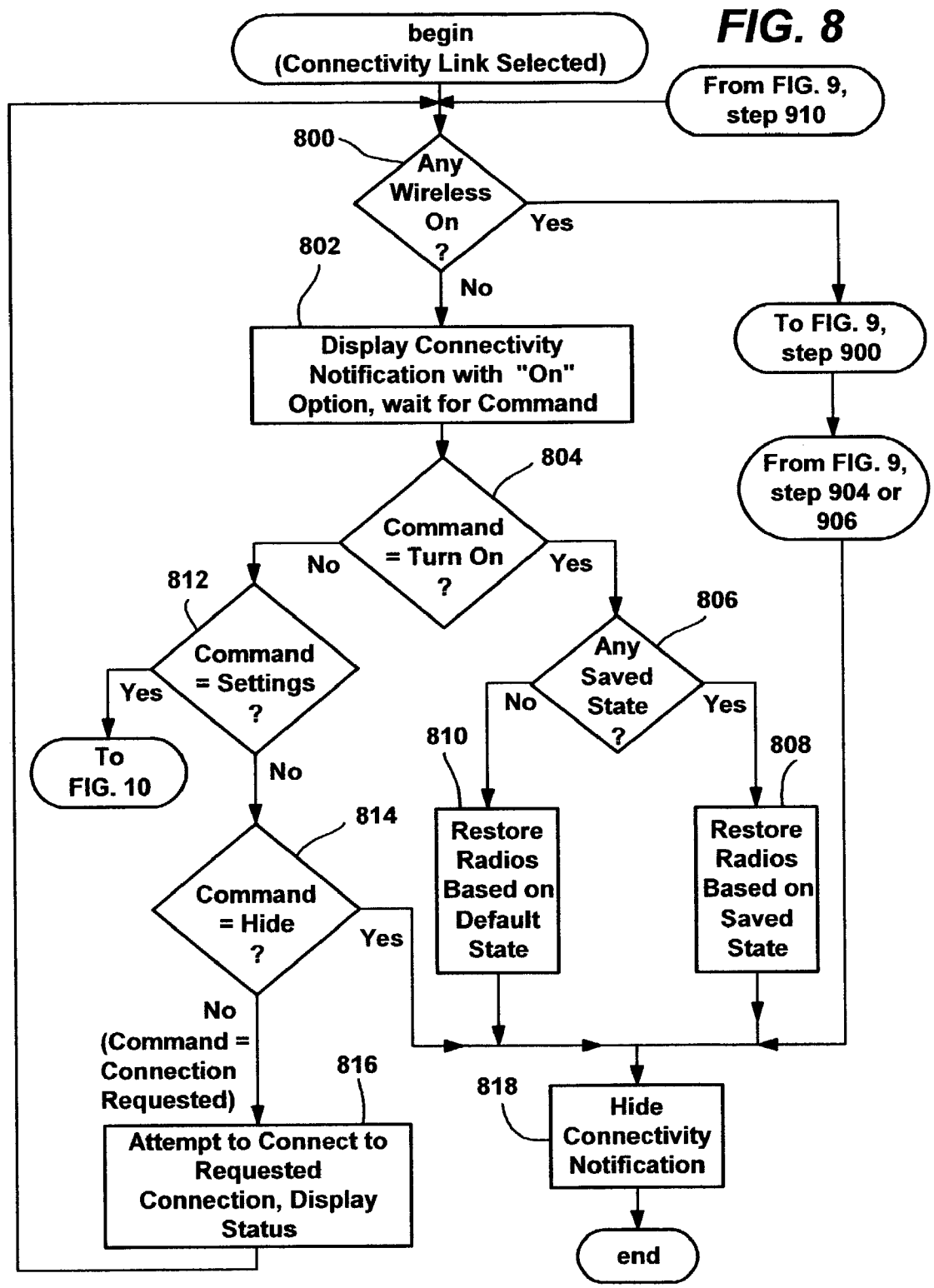
FIGS. 8-12 comprise a flow diagram generally representing rules for controlling radio power states in accordance with an aspect of the present invention.

Turning to an explanation of the operation of the present invention with particular reference to the flow diagrams of FIGS. 8-12, the logic generally depicted beginning at step 800 of FIG. 8 begins when the connectivity notification bubble (e.g., 520) has been selected, such as by tapping on the antenna/signal meter (e.g., 322 of FIG. 3) as described above. Step 800 tests whether any wireless radios $454_1$-$454_n$ are on. If so, the process branches to step 900 of FIG. 9 as described below, otherwise step 800 branches to step 802. Step 802 represents the "no radios on" state, in which the user interface displays the connectivity notification dialog 520 with the "Turn wireless on" link $526_1$, and also represents waiting for the user to enter (e.g., tap) a command. Note that such commands received at the dialog 520 may be events and handled as such by event handlers, but for purposes of the present explanation, the commands are shown in FIGS. 8-12 as being evaluated in an overall process, in some arbitrary evaluation order that is generally not significant. Further, in the present explanation, there may be other possible commands (e.g., cancel via a hardware cancel button) that are not described for purposes of simplicity.

Step 804 represents an evaluation of whether the command that was received corresponds to the "Turn wireless on" link $526_1$ having been actuated. If so, step 804 branches to step 806 which tests for whether saved state information 462 exists, (e.g., indicating which of the radios were previously on before the shutdown). If saved state 462 exists, the state is used to selectively restore those radios that were on at step 808, otherwise the radios may be turned on to match some default state (e.g., turn all radios) via step 810. After turning the radios on, the connectivity notification dialog may be removed from the display (hidden) via step 818. Alternatively, the connectivity notification dialog may be left on, e.g., for awhile, or indefinitely until manually hidden.

Returning to step 804, if the command was not the "Turn wireless on" link to turn on the radios, step 804 branches to step 812, which represents testing for other possible commands. Step 812 represents the test for whether the command resulted from the actuation of the settings link 530, which if so, causes the process to change to the settings user interface handling process of FIG. 10, as described below. If not, step 812 branches to step 814, which represents evaluating whether the command resulted from the actuation of a hide button 532. If so, the process branches to step 818 to hide the connectivity notification dialog 520. Otherwise the command was (in this limited example) a request for making a connection from the dialog 520, which is handled via step 816. Note that as represented herein, step 816 may display the status of the connection attempt, and branch back to step 800 to restart the displaying of the connectivity notification, which, if the attempted connection was successful, would result in the process branching via step 800 to FIG. 9.

Figure 9:
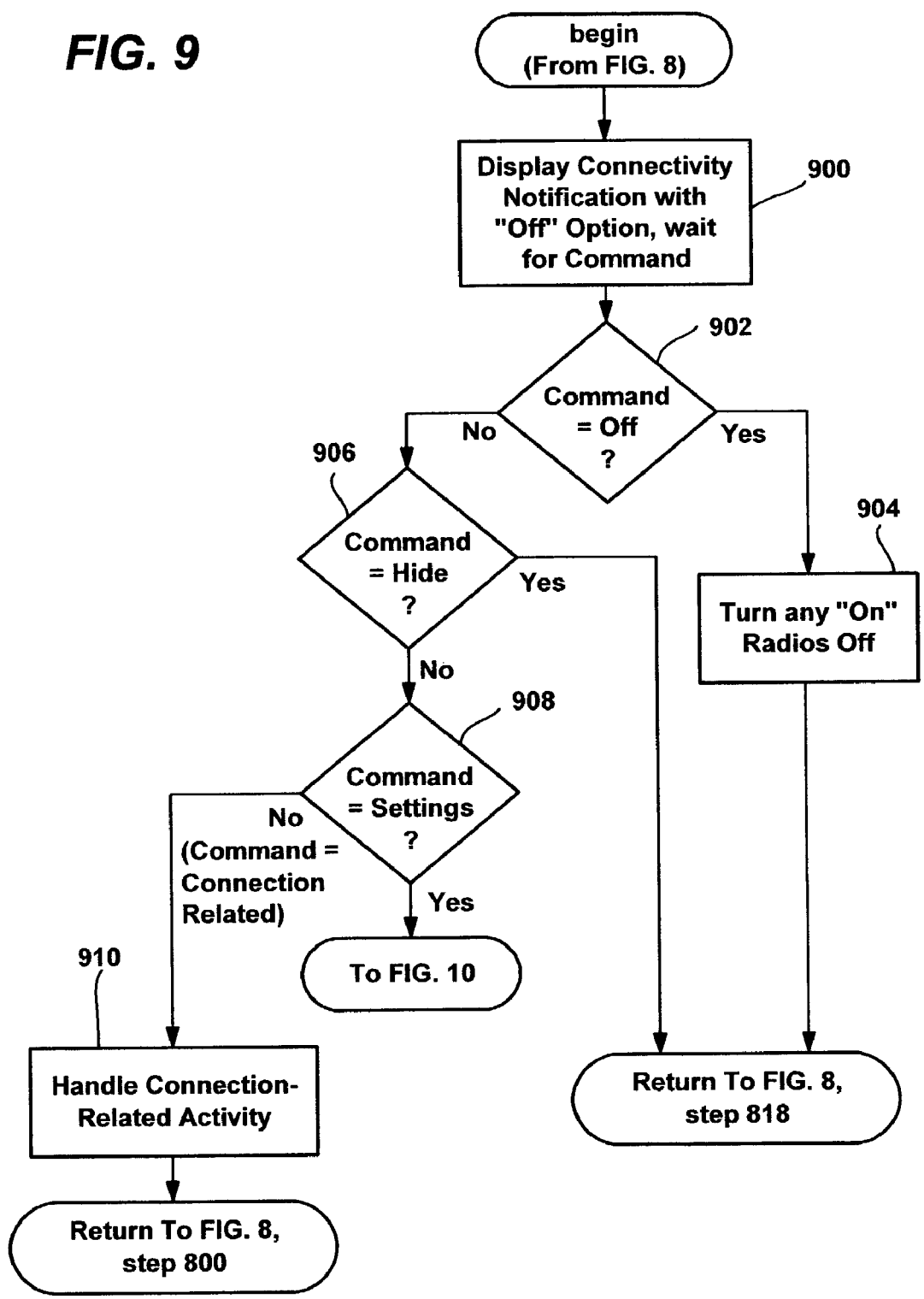

Returning to step 800, if any wireless connection exists due to one of the radios being on, step 800 branches to step 900 of FIG. 9. Step 902 represents the user interface component displaying the connectivity notification dialog (e.g., 320 of FIG. 3) with the "Turn wireless off" link $326_0$, and waiting for a command. Step 902 represents testing whether the command that was received corresponds to the "Turn wireless off" link $326_0$ having been actuated. If so, step 902 branches to step 904 which turns off all known radios $454_1$-$454_n$, which may be selectively to turn off only those that are on, or issuing one or more turn off requests to the power manager 456 regardless of the actual radio states. After turning the radios off, the process returns to step 818 of FIG. 8 to hide the connectivity notification dialog, although as described above, the dialog may alternatively remain, at least for awhile.

Figure 10:
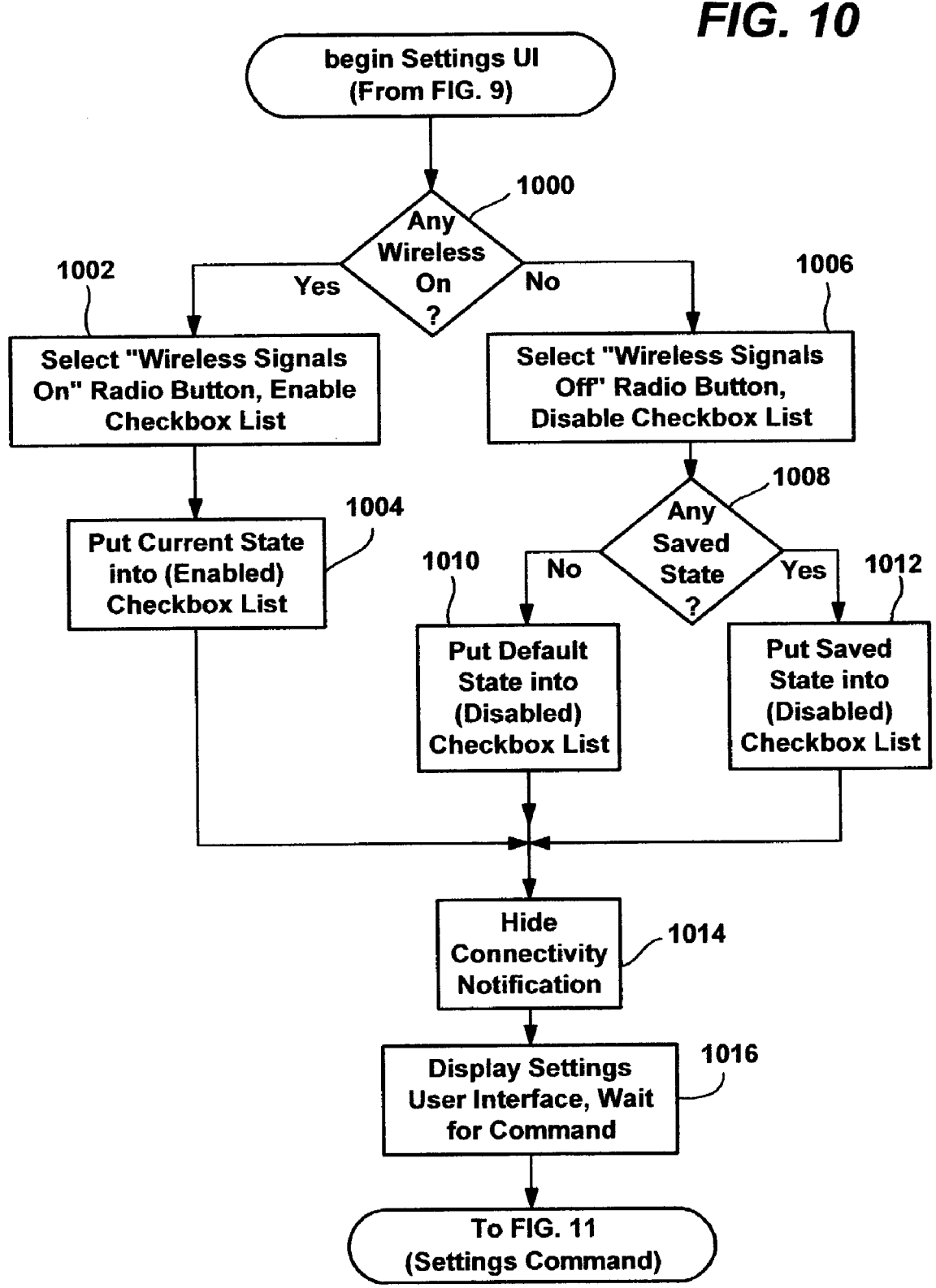

Returning to step 902, if the command was not based on actuation of the "Turn wireless off" link, step 902 branches to step 906, which represents testing for other possible commands, e.g., the "Hide" command at step 906, which if actuated returns to step 818 of FIG. 8 to hide the connectivity notification dialog, or the "Settings" command, which if actuated branches to FIG. 10, step 1000. If not the "Settings" command in this limited example, step 910 is executed, which represents some connection-related activity, such as to make (e.g., turn on) a connection that is off, or turn off a connection that is on. Step 910 represents handling this activity, which for example may provide a prompt to toggle the state of a connection, after which the process returns to step 800 of FIG. 8, to update the connectivity notification dialog based on whether at least one radio is on, and await another command.

Figure 11:
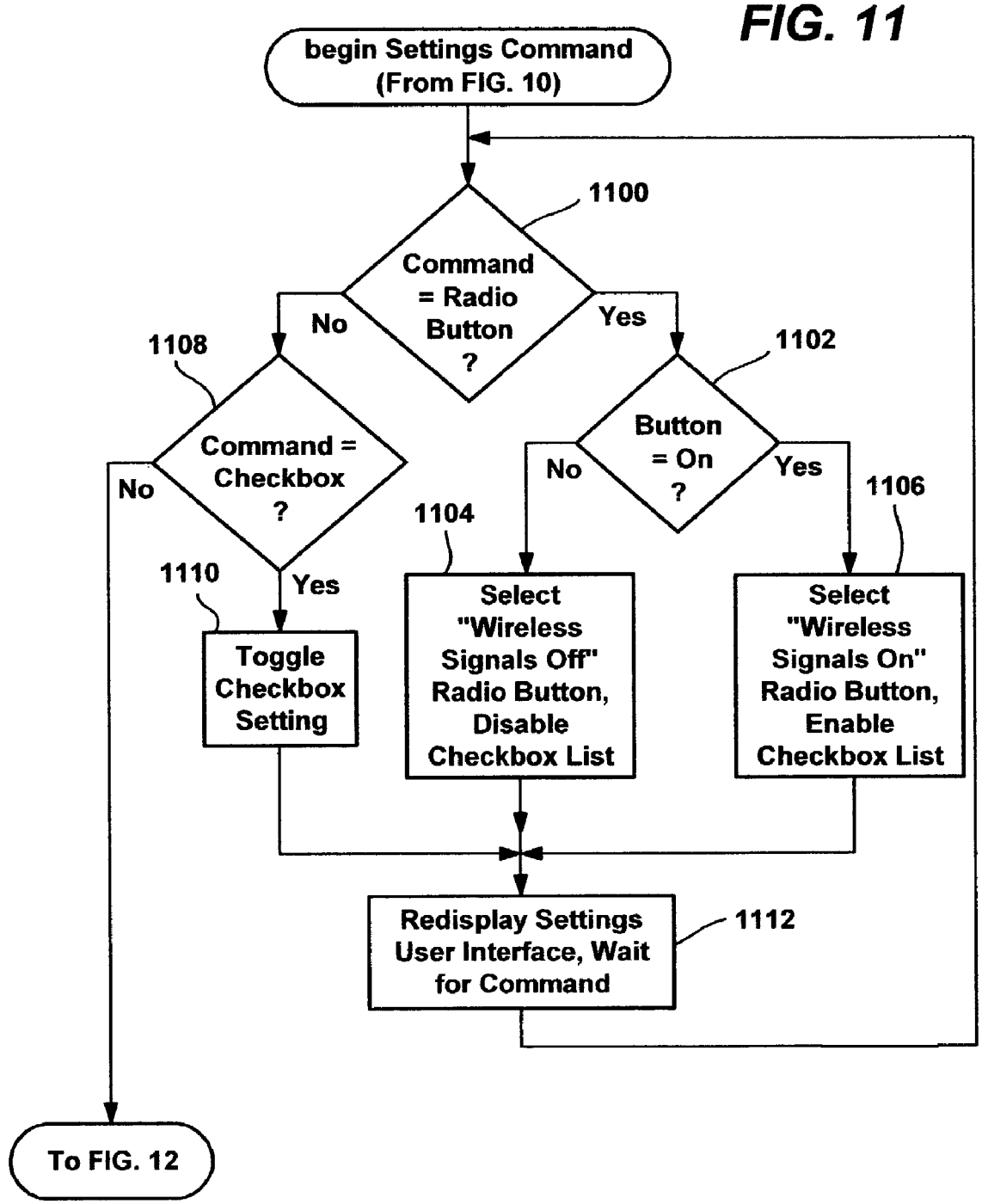
Figure 12:
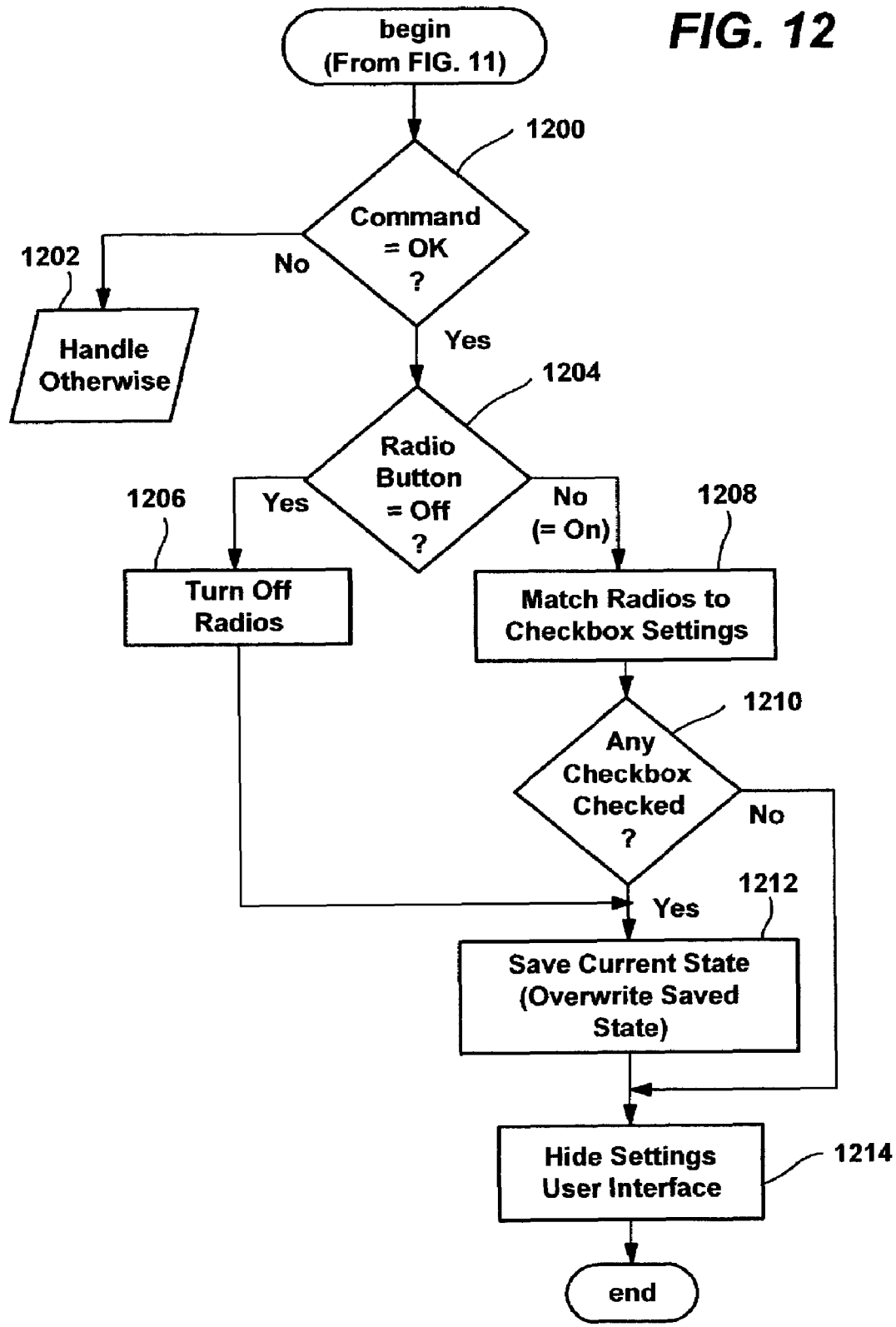

FIGS. 10-12 represent the process that implements the rules for the settings user interface 660 (FIG. 6), beginning at step 1000 which represents determining if any wireless connection exists due to one of the radios being on. If so, step 1000 branches to step 1002 to select the "Wireless signals on" radio button of FIG. 6, (e.g., fill in the circle of the "on" button and clear the circle of the "off" button), and enable the checkbox list 664. Step 1004 represents putting the current state into the checkbox list 664, e.g., putting an "X" in the checkbox of each radio that is on, as represented in FIG. 6. Step 1004 then continues to step 1014 which represents changing the display to reflect the configured settings user interface 660, e.g., hiding the connectivity notification 520 (if displayed) and replacing it at step 1016 with the settings user interface 660 as configured via steps 1002 and 1004. Of course it is equivalent to first display the settings dialog and then reconfigure the display to match the settings. Step 1016 also represents waiting for a settings-related command.

Returning to step 1000, if no wireless radios are on, step 1000 instead branches to step 1006, which selects the "Wireless signals off" radio button, (e.g., fills in the circle of the "off" button and clears the circle of the "on" button), and disables the checkbox list 664 (e.g., including graying it out to indicate disabled to the user). Step 1008 then tests for whether any previous state 462 is saved for radios which had been on. If not, step 1010 puts a default state (e.g., no radios on) into the (disabled) checkboxes 664, otherwise step 1012 puts the saved state 462 as into the checkboxes. As described above, step 1014 hides the connectivity notification (if displayed), and step 1016 displays the settings user interface 660, as configured via step 1006 and step 1010 or 1012, and waiting for a settings-related command.

FIGS. 11 and 12 represent processing a settings-related command, beginning at step 1100 which tests whether the received command corresponds to one of the radio buttons 662 having been actuated. If so, step 1100 branches to step 1102 to determine which button was tapped. If it was the off radio button, step 1104 selects the "off" button and deselects the "on" button (e.g., fills in the "off" button's circle while clearing the "on" button's circle) and disables the checkbox list 664. Conversely if the "on" button was tapped, step 1104 selects the "on" button, deselects the "off" button, and enables the checkbox list 664. Step 1112 is then executed, which represents redisplaying the settings user interface 660 to update changes, and await another command.

Returning to step 1100, if the command was not a radio button 662, step 1108 represents testing whether one of the checkboxes 664 was tapped. If so, step 1110 toggles the setting of the one that was tapped, and continues to step 1112 to redisplay the settings user interface 660 to update the checkbox change, and await another command. If not, step 1108 branches to step 1200 of FIG. 12 to otherwise process the command.

Step 1200 represents handling the "OK" button 668. In this limited example, the "OK" button 668 is the only other command described, however in FIG. 6, the user can perform other options, such as to scroll the display, tap a "General" tab (or tap a "Settings" tab), and so on. Step 1202 generally represents the handling of these other commands, which can be handled in a typical manner (and although not shown, may return to step 1112 to await another command). In the event that the "OK" button 668 was tapped, step 1200 branches to step 1204 to test whether the "Wireless signals off" radio button is selected. If so, step 1206 turns off the known radios 454$_1$-454$_n$, step 1212 saves the current state as indicated in the checkboxes 664 as the saved state 462, and step 1214 hides the settings user interface 660 before ending the process.

If at step 1204 the radio buttons 662 indicated a "Wireless signals on" state when the "OK" button is tapped, step 1208 controls each radio to match its setting as indicated in the checkbox list 664. Note that it is possible for the user to tap the "OK" radio button with all of the known radios manually unchecked. This is treated as if the user has effectively switched to the "wireless off" mode, however if so, steps 1210 bypasses step 1212 and thereby preserves the previously saved state 462 of the radios, to maintain the state as it was when the user originally entered this user interface 660. Doing so lets the user quickly restore the state via the connectivity notification dialog's "Turn wireless on" link 526$_1$. Alternatively, if at least one checkbox is checked when the "OK" button is tapped, step 1212 saves the current state in the checkbox list 664 over the previous state 462. Step 1214 hides the settings dialog 660 and ends the process.

In sum, quickly and conveniently turning off all radios (e.g., when instructed to avoid interference) is a highly desirable feature, as is turning radios back on. To this end, the "Turn wireless off" and "Turn wireless on" links (FIGS. 3-5) are provided, which appear in a connectivity dialog based on the power state of the known radios. The "off" link is shown whenever at least one radio is present that can be disabled (which in the present example include the phone, wi-fi, and Bluetooth™) radios. Clicking this "off" link will save the on/off state of the current radios, then turn off any that are on. This functionality will work with add-on or integrated radios.

Note that original equipment manufacturers (OEMs) may wish to place a hardware button that mimics the behavior of the "Turn wireless off" link, since the OEMs control the button and drivers. An application programming interface (API) may also be provided to facilitate this behavior. The actuation method may be 'press and hold' or 'press', with the OEM specifying which hardware button, e.g., 'press and hold' an 'End' key or a separate power key.

As can be appreciated, virtually any mobile device having a radio and battery may benefit from the present invention. For example, on a Smartphone or PocketPC with a phone, when the user clicks "Turn wireless off," the on/off state of Bluetooth™ may be stored, and the phone and Bluetooth™ turned off. When the user clicks "Turn wireless on," the on/off state of Bluetooth™ is restored, and the phone turned on.

In one implementation, wireless radios will be enumerated and shut off/on as described below, whether for integrated or add-on wireless radios. New radios are thus able to participate in both the "Turn wireless off" switch and the new "Wireless" power control panel dialog, described above. Enumeration and shut off/on may be accomplished differently for the different types of radios.

For example, integrated phone and Bluetooth™ radios may use the existing mechanisms to be enumerated and shut down, e.g., Bluetooth™ add-on cards that utilize a Bluetooth™ stack can be easily controlled. Notwithstanding, such existing mechanisms may also be controlled by conforming to the system's power management scheme. In general, power manager implements an abstract interface that radios can call into to be notified that they are to be shut down or started up. For example, in one implementation, other wireless radios, including wi-fi, can be turned on/off by conforming to Microsoft®Windows® CE Power Manager Specifications, including writing registry keys to become discovered as radios. A define registry entries key enables the advertising of a GUID that Power Manager recognizes as a "radio class," which can be accomplished by using AdvertiseInterface( ) or by adding this GUID to the IClass REG_MULTI_SZ value in their configuration registry key. If the device is disabled or removed, this is to be found out via the Power Manager, and control not attempted of that wireless radio.

Devices that ship with integrated wireless devices should preinstall the proper registry keys, and IHVs can write the registry keys when their drivers load. For Power Manager to recognize this radio class, a new GUID may be added to the HKEY_LOCAL_MACHINE registry entry: HKLM->SYSTEM->CurrentControlSet->Control->Power->Interfaces.

Note that other alternatives for the text of the "off" link (with corresponding "on" text) are also feasible, including, "Turn signals off," "Turn communications off," "Turn wireless off" (as shown in FIGS. 2 and 3), "Turn all wireless off," "Airplane mode on" (note that airplanes are often the cause for a user needing to turn all radios off, in contrast to the power saving case, in which the user may simply press the master power button and assume radios are off, even when they are not), 'Turn phone off,' and/or 'Turn connectivity off.'

Figure 13:
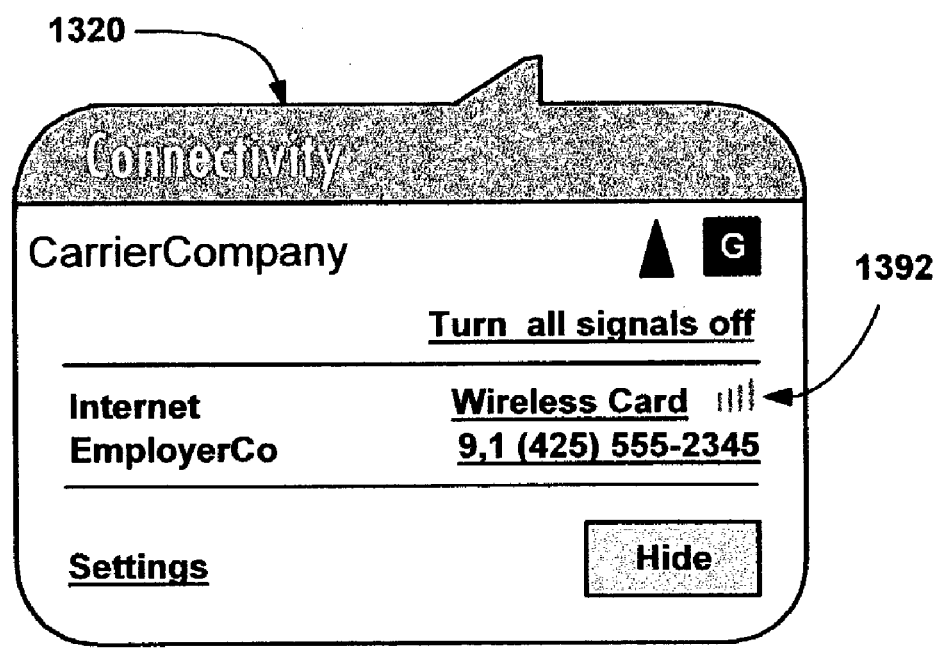
FIGS. 13-15 are representations of alternative connectivity user interface dialogs for performing similar radio power control operations in accordance with an aspect of the present invention.
Figure 14:
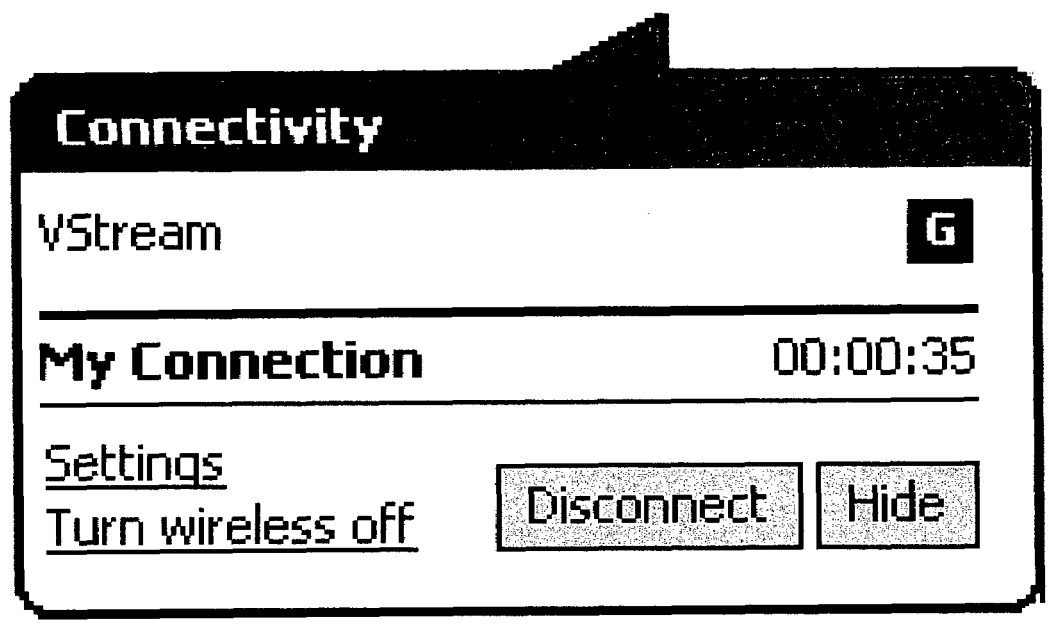
Figure 15:
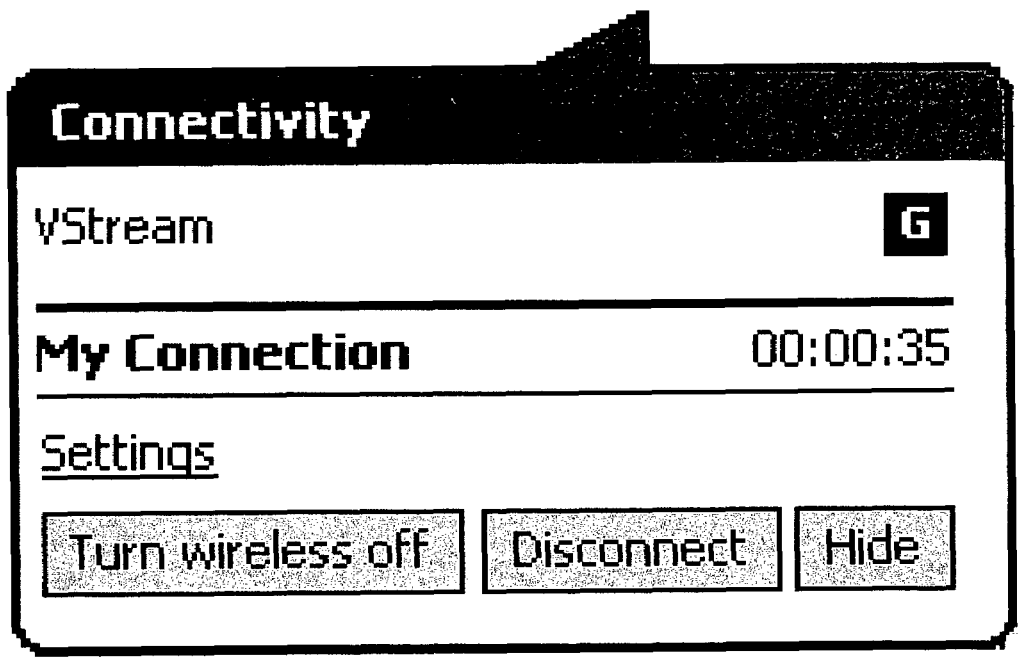

Examples of some alternative implementations and user interfaces are also represented in FIGS. 13-15. For example, FIG. 13 shows a connectivity user interface 1320 in the form of a bubble, in which it is possible to turn off the Wireless Card via a "Wireless card" link 1392 in the bubble 1320. If the user clicks the Wireless card link 1392, it turns the wireless card off. Note however that it may be more difficult to turn the wireless card back on, since the line with "The Internet" will not be present when the card is off. However, instead of removing the internet link when there is no connection, a special link indicating that the Internet is disconnected, and enabling the wireless card to be turned on, instead may be provided.

FIGS. 14 and 15 represent alternative bubble-type displays for providing a link/button to turn the wireless off (or when off, turn wireless on). The functionality of such a "Turn wireless off" link/button is generally as described above. Again, note that a pop-up bubble is only one way in which the link/button may be presented to the user, and many other user interface configurations (e.g., drop-down menu, dialog box, and so on) capable of providing the link/button are equivalent.

As can be seen from the foregoing, the present invention provides a master switch comprising a top-level user interface entry point by which a user may turn off or on a mobile device's radios in a single operation via a power manager. Further, the device's radios may be individually controlled by turning them on or off via the power manager. If the radios are in a mixed state (that is, some off, some on) and the user turns them all off using the master switch, the prior state may be saved and restored when the master switch (link) is used to turn the radios back on. An abstract layer (e.g., API) is also provided that radio vendors can use to have their radios be recognized and controlled by the power manager, which abstracts various methods for turning such radios on or off into one function. The systems and methods of the present invention thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device, a method for automatically restoring the power state of one or more wireless radios from among a plurality of wireless radios in the computing device to a stored power state upon detecting that one of the plurality is to be used by a software application, the method comprising:
- receiving a first indication from a user of a computing device that each of the wireless radios of the computing device that is currently turned on is to be turned off;
- accessing a power management component to determine the current power state for each of the plurality of wireless radios in the computing device, the current power state indicating for each radio whether each radio is currently turned on or turned off when the first indication is received;
- storing the determined current power state for each of the plurality of wireless radios;
- in response to the first indication, automatically turning off each of the one or more active wireless radios without turning off the computing device;
- receiving a second indication from a source external to the computing device indicating that an intended wireless radio of the computing device is to be used;
- in response to the second indication, automatically restoring each of the wireless radios to the stored power state for each radio, such that each of the wireless radios that was turned off when the first indication was received remains turned off according to the stored power state, and that those wireless radios that were turned on when the first indication was received are turned on according to the stored power state; and
- displaying on the computing device an indication of the active power state for at least one of the plurality of wireless radios.

2. The method of claim 1 further comprising, providing a link to collectively turn off each active wireless radio.

3. The method of claim 1 further comprising providing an on link when no wireless radios are active to collectively turn on at least one wireless radio of a plurality of wireless radios of the computer system, detecting actuation of the on link, and turning on at least one wireless radio in response to the detected actuation of the on link.

4. The method of claim 1 further comprising, saving the active power state of at least one wireless radio as the power state existed before turning off each active wireless radio.

5. The method of claim 4 further comprising, providing an on link when no wireless radios are active to collectively turn on at least one wireless radio of a plurality of wireless radios of the computer system, detecting actuation of the on link, obtaining the saved power state, and selectively turning on at least one radio based on the saved power state.

6. The method of claim 1 further comprising, saving the power state of each wireless radio as the power state for each existed before turning off each active wireless radio, and providing an on link when no wireless radios are active to collectively turn on each wireless radio that was previously on according to the saved power state.

7. The method of claim 1 further comprising, providing a settings link to settings user interface, the settings user interface enabling selective control of the power state of each individual wireless radio.

8. The method of claim 1 further comprising, providing a settings user interface, the settings user interface enabling selective control of the power state of each individual wireless radio.

9. The method of claim 8 wherein the settings user interface lists each wireless radio of the plurality.

10. The method of claim 9 further comprising, providing a checkbox in the settings user interface for each wireless radio of the plurality.

11. The method of claim 10 further comprising, providing an on radio button and an off radio button in the settings user interface, the on radio button when selected enabling interaction with each checkbox, and the off radio button when selected disabling interaction with each checkbox.

12. The method of claim 10 further comprising, providing an on radio button, an off radio button and an OK button in the settings user interface, detecting selection of the OK button, determining whether the on radio button or the off radio button is selected, and if the on radio button is selected, turning on each wireless radio that is represented as being selected via its checkbox, and when the off radio button is selected, turning off each wireless radio in the plurality.

13. The method of claim 11 further comprising, saving the state of the radios as represented in the checkboxes.

14. The method of claim 11 further comprising, determining whether the on radio button is selected but none of the checkboxes are selected, and if so, preserving the prior power state of the radios.

15. The method of claim 1, further comprising:
- accessing the stored power state for each of the plurality of wireless radios; and
- displaying on the computing device the stored power state for each of the plurality of wireless radios.

16. The method of claim 1, further comprising:
- determining that each of the plurality of wireless devices is turned off in response to the first indication;
- accessing the stored power state for each of the plurality of wireless radios, the stored power state indicating the power state of each radio at the time the first indication was received;
- displaying a representation of each of the plurality of wireless radios, each representation including an activation item configured to activate or deactivate the radio, each representation further including an indication of the stored power state for each radio.

17. The method of claim 16, wherein the indication of the stored power state for each radio is displayed even if the activation item is disabled.

18. In a computer system, a method comprising:
- detecting that at least one wireless radio of a plurality of wireless radios of the computer system is active;
- providing a link in the form of an off link to collectively turn off each active wireless radio;
- receiving a first indication from a user of a computing device that each of the wireless radios of the computing device that is currently turned on is to be turned off;
- detecting actuation of the off link;
- accessing a power management component to determine the current power state for each of the plurality of wireless radios in the computing device, the current power state indicating for each radio whether each radio is currently turned on or turned off when the first indication is received;
- storing the determined current power state for each of the plurality of wireless radios;
- in response to a single detected actuation of the off link and in response to the first indication, automatically turning off each of the one or more active wireless radios without turning off the computing device receiving a second indication from a source external to the computing device indicating that an intended wireless radio of the computing device is to be used;

in response to the second indication, automatically restoring each of the wireless radios to the stored power state for each radio, such that each of the wireless radios that was turned off when the first indication was received remains turned off according to the stored power state, and that those wireless radios that were turned on when the first indication was received are turned on according to the stored power state; and displaying on the computer system an indication of the active power state for at least one of the plurality of wireless radios.

19. The method of claim 18 wherein the link comprises the off link, and further comprising, saving the power state of each wireless radio as the power state existed before turning off each active wireless radio.

20. The method of claim 19 wherein the link comprises the on link, and further comprising, detecting actuation of the on link, obtaining the saved power state, and selectively turning on each wireless radio that was previously on according to the saved power state.

21. The method of claim 18 further comprising, providing a settings link to settings user interface, the settings user interface enabling selective control of the power state of each individual wireless radio.

22. The method of claim 18 further comprising, providing a settings user interface, the settings user interface enabling selective control of the power state of each individual wireless radio.

23. The method of claim 22 wherein the settings user interface lists each wireless radio of the plurality.

24. The method of claim 23 further comprising, providing a checkbox in the settings user interface for each wireless radio of the plurality.

25. The method of claim 24 further comprising, providing an on radio button and an off radio button in the settings user interface, the on radio button when selected enabling interaction with each checkbox, and the off radio button when selected disabling interaction with each checkbox.

26. The method of claim 24 further comprising, providing an on radio button, an off radio button and an OK button in the settings user interface, detecting selection of the OK button, determining whether the on radio button or the off radio button is selected, and if the on radio button is selected, turning on each wireless radio that is represented as being selected via its checkbox, and when the off radio button is selected, turning off each wireless radio in the plurality.

27. The method of claim 26 further comprising, saving the state of the radios as represented in the checkboxes.

28. The method of claim 27 further comprising, determining whether the on radio button is selected but none of the checkboxes are selected, and if so, preserving the prior power state of the radios.

29. In a computing device, a system configured to automatically restore the power state of one or more wireless radios from among a plurality of wireless radios in the computing device to a stored power state upon detecting that one of the plurality is to be used by a software application, the system comprising:

a plurality of wireless radios;

a power manager connected to control the state of each of the wireless radios, the power manager being configured to determine the current power state for each of the plurality of wireless radios in the computing device;

a connectivity user interface component configured to:
receive a first indication from a user of a computing device that each of the wireless radios of the computing device that is currently turned on is to be turned off;

access the power management component to determine the current power state for each of the plurality of wireless radios in the computing device, the current power state indicating for each radio whether each radio is currently turned on or turned off when a first indication is received;

store the determined current power state for each of the plurality of wireless radios;

in response to the first indication, automatically turn off each of the one or more active wireless radios without turning off the computing device;

receive a second indication from a source external to the computing device indicating that an intended wireless radio of the computing device is to be used;

in response to the second indication, automatically restoring each of the wireless radios to the stored power state for each radio, such that each of the wireless radios that was turned off when the first indication was received remains turned off according to the stored power state, and that those wireless radios that were turned on when the first indication was received are turned on according to the stored power state; and a display configured to display on the computing device an indication of the active power state for at least one of the plurality of wireless radios.

30. The system of claim 29 further comprising a storage that maintains a power state of each wireless radio as the power state existed before each active wireless radio is turned off.

31. The system of claim 30 wherein when no wireless radios are active, the connectivity user interface component provides an on link to collectively restore the power state of at least one radio according to the power state in the storage.

32. The system of claim 29 wherein when no wireless radios are active, the connectivity user interface component provides an on link to collectively turn on at least one wireless radio, by communicating with the power manager upon actuation of the link.

33. The system of claim 29 wherein the connectivity user interface component provides a link to a settings user interface that enables selective control of the power state of each individual wireless radio.

34. The system of claim 29 further comprising, a settings user interface that enables selective control of the power state of each individual wireless radio.

35. The system of claim 34 wherein the settings user interface provides a wireless on and wireless off interaction mechanism.

36. The system of claim 34 wherein the settings user interface lists each wireless radio of the plurality and provides a selection mechanism for each wireless radio.

37. The system of claim 34 further comprising a link arranged as a hardware button that when actuated provides information to control the power state of the wireless radios.

38. The system of claim 37 wherein as a result of actuation of the hardware button, the connectivity user interface component updates displayed information to reflect the current power state of the wireless radios.

* * * * *